United States Patent
Scofield et al.

(10) Patent No.: US 10,754,950 B2
(45) Date of Patent: Aug. 25, 2020

(54) ENTITY RESOLUTION-BASED MALICIOUS FILE DETECTION

(71) Applicant: Assured Information Security, Inc., Rome, NY (US)

(72) Inventors: Daniel Scofield, Portland, OR (US); Craig Miles, Portland, OR (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 282 days.

(21) Appl. No.: 15/827,211

(22) Filed: Nov. 30, 2017

(65) Prior Publication Data

US 2019/0163907 A1 May 30, 2019

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01); *G06F 2221/033* (2013.01); *G06F 2221/034* (2013.01)

(58) Field of Classification Search
CPC .. G06F 21/566; G06F 21/53; G06F 2221/033; G06F 2221/034
See application file for complete search history.

(56) References Cited

U.S. PATENT DOCUMENTS

| | | | | |
|---|---|---|---|---|
| 2013/0254549 A1* | 9/2013 | Greene | ................. | G09C 5/00 713/189 |
| 2014/0090061 A1* | 3/2014 | Avasarala | .............. | G06F 21/56 726/24 |
| 2014/0283041 A1* | 9/2014 | Cao | ................. | G06F 21/563 726/22 |
| 2015/0256552 A1* | 9/2015 | Lee | ................. | G06F 21/554 726/24 |
| 2015/0261955 A1* | 9/2015 | Huang | ............. | G06F 21/562 726/23 |

(Continued)

OTHER PUBLICATIONS

Vatamanu, C., et al., "A practical approach on clustering malicious PDF documents." Journal in Computer Virology 8, 4 (2012), pp. 151-163.

(Continued)

*Primary Examiner* — Kristine L Kincaid
*Assistant Examiner* — Zoha Piyadehghibi Tafaghodi
(74) *Attorney, Agent, or Firm* — Mathew M. Hulihan; Heslin Rothenberg Farley & Mesiti PC

(57) ABSTRACT

A method includes monitoring system call invocations made to an operating system of a computer system by an application as the application renders a digital file. The method automatically featurizes the system call invocations into a set of features corresponding to the digital file, and compares each feature set against benign features of a set of known benign features. The comparing includes, for each feature of the set of features, applying entity resolution between the feature and benign feature(s) of the set of known benign features to find a correlation between the feature and a benign feature representing a common semantic interaction between the application and the operating system. The method identifies a number of features that do not correlate to the benign features, and determines maliciousness of the digital file based on the identified number of features that do not correlate to the benign features.

20 Claims, 6 Drawing Sheets

(56) References Cited

U.S. PATENT DOCUMENTS

| | | | | |
|---|---|---|---|---|
| 2015/0281267 | A1* | 10/2015 | Danahy | H04L 63/1416 726/23 |
| 2017/0032279 | A1* | 2/2017 | Miserendino | H04W 12/1208 |
| 2017/0091461 | A1* | 3/2017 | Tin | G06F 21/564 |
| 2017/0206357 | A1* | 7/2017 | Gorelik | G06F 21/52 |
| 2017/0223046 | A1* | 8/2017 | Singh | H04L 43/062 |
| 2017/0262633 | A1* | 9/2017 | Miserendino | G06F 21/566 |
| 2018/0114018 | A1* | 4/2018 | Zhang | G06F 21/562 |

OTHER PUBLICATIONS

Nissim, N., et al., "Detection of malicious PDF files and directions for enhancements: a state-of-the art survey." Computers & Security 48 (2015), pp. 246-266.

Bazzi, A., et al., "IDS for detecting malicious nonexecutable files using dynamic analysis." 2013. In APNOMS. pp. 1-3.

Smutz, C., et al., "Malicious PDF detection using metadata and structural features." In Proceedings of the 28th Annual Computer Security Applications Conference. 2012. ACM, pp. 239-248.

Šrndić, N., et al., "Detection of malicious PDF files based on hierarchical document structure." In Proceedings of the 20th Annual Network & Distributed System Security Symposium. 2013, 16 pgs.

Pareek, H., et al., "Entropy and n-gram analysis of malicious PDF documents." Int J Eng Res Tech 2, 2 (2013), 3 pgs.

Maiorca, D., et al., "A pattern recognition system for malicious PDF files detection." In International Workshop on Machine Learning and Data Mining in Pattern Recognition. 2012, Springer, pp. 510-524.

Laskov, P., et al., "Static detection of malicious JavaScriptbearing PDF documents." In Proceedings of the 27th Annual Computer Security Applications Conference. 2011. ACM, pp. 373-382.

Jang, J., et al., "Bitshred: feature hashing malware for scalable triage and semantic analysis." In Proceedings of the 18th ACM conference on Computer and communications security. 2011. ACM, pp. 309-320.

Schneider, S., et al., "Automatic generation of string signatures for malware detection." In International Workshop on Recent Advances in Intrusion Detection. 2009. Springer, pp. 101-120.

Islam, R., et al., "Classification of malware based on string and function feature selection." In Cybercrime and Trustworthy Computing Workshop (CTC), 2010 Second. IEEE, pp. 9-17.

Garfinkel, T., et al., "A Virtual Machine Introspection Based Architecture for Intrusion Detection." In NDSS, 2013, vol. 3, pp. 191-206.

Engleberth, M., et al., "Detecting malicious documents with combined static and dynamic analysis" (Powerpoint Presentation). Virus Bulletin (2009), 37 pgs.

Bailey, M., et al., Automated classification and analysis of internet malware. In International Workshop on Recent Advances in Intrusion Detection. 2007, Springer, pp. 178-197.

* cited by examiner

ENTITY RESOLUTION-BASED MALICIOUS FILE DETECTION

STATEMENT REGARDING FEDERALLY SPONSORED RESEARCH

This invention was made with government support under contract FA8750-15-C-0017 awarded by the Department of the Air Force. The government has certain rights in the invention.

BACKGROUND

Some modern cyber attacks are conducted by distributing digital documents that contain embedded malware. Common file formats used for malware distribution include the Portable Document Format (PDF) and the Microsoft Word format (DOC, DOCX). When an unsuspecting user opens a malicious document, the malware embedded therein executes and compromises the user's system. Since system compromise is undesirable, methodologies and tools for classifying the maliciousness of documents, i.e. as being either malicious or benign, and determining their disposition, are needed.

One approach for classifying a document is to check for anomalies in static features extracted from the document. Another approach, such as that employed by antivirus scanners, is to test the document against byte-signatures derived from previously seen malicious documents. Yet another approach works by monitoring the run-time behavior of a document viewer for unexpected actions as it renders the document. All of these approaches for malicious document detection are trained on, or seeded with, characterizations of previously encountered malicious and/or benign documents. For instance, traditional antivirus systems rely on curated databases of byte-signatures to detect malicious documents and machine learning approaches rely on models trained using features (weighted byte n-grams, dynamic execution artifacts, etc.) extracted from a corpus containing malicious and/or benign documents. This results in inefficiencies, for instance unwieldy corpus sizes and unnecessary training.

SUMMARY

Shortcomings of the prior art are overcome and additional advantages are provided through the provision of a computer-implemented method for assessing maliciousness of a subject digital file on a computer system. The method includes monitoring system call invocations made to an operating system of the computer system by an application as the application processes the digital file, the digital file being of a defined file type with which the application is associated for processing digital files of the defined file type; automatically featurizing the system call invocations into a set of features corresponding to the digital file; comparing each feature of the set of features against benign features of a set of known benign features obtained based on benign digital files of the defined file type, the comparing comprising, for each feature of the set of features, applying entity resolution between the feature and one or more benign features of the set of known benign features to attempt to find a correlation between the feature and a benign feature of the set of known benign features representing a common semantic interaction between the application and the operating system; identifying, based on the comparing, a number of features of the set of features that do not correlate to the benign features of the set of known benign features; and determining maliciousness of the digital file based on the identified number of features that do not correlate to the set of known benign features.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
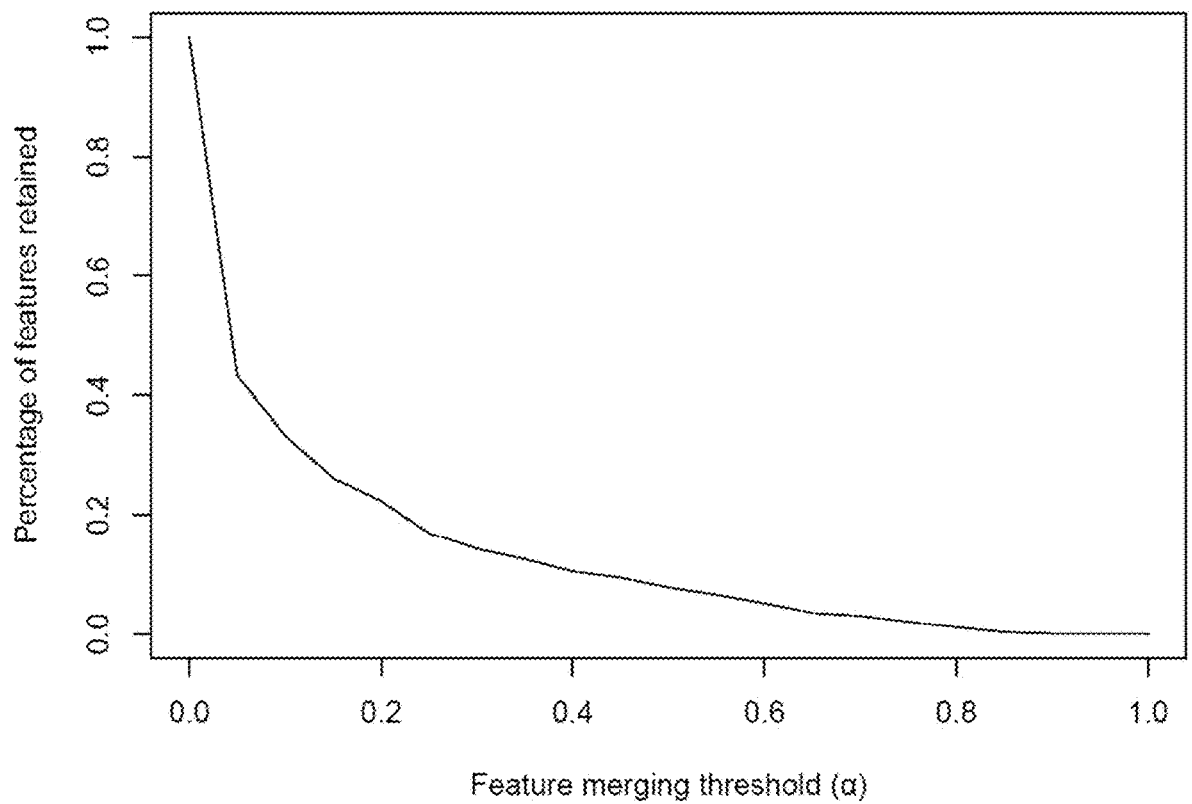
FIG. 1 depicts an effect of varying a feature merging threshold on a percentage of original features retained after feature merging via an entity resolution approach, in accordance with aspects described herein.

Described herein are methods for assessing maliciousness of a subject digital file on a computer system. Models described herein provide small, workable feature-sets providing extremely high accuracy in classifying malicious documents.

It is a common failing to assume that the size of one's corpus or feature set is of the utmost importance, as is evidenced by the gargantuan malware data sets hoarded by cyber-security researchers and analysts, the prevalence of up-to-the-minute malware feeds hawked by commercial vendors, and the many thousands of results arising from a search of technical papers for the phrase 'large corpus'. Though most researchers are aware of the law of diminishing returns and could even quantify the marginal utility of training on an extra datum if so pressed, it is nonetheless tempting to train on as much data as possible. Given this temptation, it is perhaps unsurprising that relatively little work has been done to determine just how small of a corpus or feature set one can maintain while still attaining high accuracy.

Approaches detailed herein, which include a classifier that uses features derived from dynamic analysis of and application as it processes a document in question, are capable of classifying the disposition of digital files with high accuracy (in some cases 98% or greater) even when its model is trained on just small amount of data. The features employed correspond to the runtime interactions that the application makes with its underlying operating system (OS) while it is processing a document. Example interactions include opening a file and reading a registry key. For instance, one example feature might record that the document viewer wrote data to the file on path C:\example.txt. Concretely, a 'feature' as used herein records information about the invocation of a system call (for instance a Windows® OS system call) by the application (WINDOWS is a registered trademark of Microsoft Corporation, Redmond, Wash., U.S.A.). To keep the classification model itself small and thereby provide scalability, an entity resolution strategy is disclosed that merges syntactically disparate features that are considered semantically equivalent.

Approaches detailed herein, which include a classifier that uses features derived from dynamic analysis of an application as it processes a document in question, are capable of classifying the disposition of digital files with high accuracy (in some cases 98% or greater) even when its model is trained on just small amount of data. The features employed correspond to the runtime interactions that the application makes with its underlying operating system (OS) while it is processing a document. Example interactions include opening a file and reading a registry key. For instance, one example feature might record that the document viewer wrote data to the file on path C:\example.txt. Concretely, a 'feature' as used herein records information about the invocation of a system call (for instance a Windows® OS system call) by the application (WINDOWS is a registered trademark of Microsoft Corporation, Redmond, Wash., U.S.A.). To keep the classification model itself small and thereby provide scalability, an entity resolution strategy is disclosed that merges syntactically disparate features that are considered semantically equivalent.

A classifier as described in examples presented herein is based on the aggregation of document viewer/OS interactions arising from the rendering of some benign documents into a whitelist. Thereafter, any other document that induces the document viewer to make non-whitelisted requests of a selected frequency and/or type to the OS can be deemed malicious.

A naive strategy based on this whitelisting might be unsuccessful due to the large degree of programmatic randomness present in system call arguments. For example, the document viewer might always write logging information to a temporary file with a runtime-generated random file name. Since the file paths corresponding to these file writes differ syntactically across runs, no whitelist of finite size (modulo machine limits) will be sufficient to characterize all possible future write requests.

To overcome the issue of programmatic randomness in the features, presented herein is an approach for distilling a set of features down to a minimal set of exemplars. The distillation process invokes entity resolution in which correlations are found between features that differ syntactically but represent a common semantic interaction between the document viewer and the OS. Such features are merged together into a single exemplar. This entity resolution strategy can merge features that differ due to instances of programmatic randomness, and is facilitated by way of a heuristic threshold (in some examples) for determining string similarity. One example of such similarity is "edit distance" or "string distance". A specific example of edit distance that may be used in accordance with aspects described herein is the Levenshtein edit distance. If the string representation of a feature can be transformed into the string representation of another feature using fewer than some threshold number of edit operations (as an example), then the two features are merged into one in accordance with aspects described herein.

After the exemplar whitelist is generated, classification is conducted by monitoring an application, for instance a document viewer, as it processes a digital file, for instance renders a subject document in question. The observed system call invocations are featurized as described, for instance in a same or similar manner as was used to build the distilled whitelist, and compared to the distilled whitelist. The expectation is that anomalous features arising from a malicious digital file will neither match nor merge with any of the whitelisted exemplars. If some criterion or criteria are met, for instance the number of those non-mergeable features exceeds some threshold, then the digital file may be declared to be malicious.

Accordingly, described herein are approaches for assessing maliciousness of digital files, for instance digital documents or other files of any of various formats. Reference to an 'application' that processes the digital file is a reference to an application that is configured to open and process the digital file of the given format in order to display, render, open, play, edit, or process the file in any other desired or intended manner. As noted, the application may therefore be a document viewer application to view a digital document, for instance. An example type/format of digital document is the Portable Document File (PDF) digital document of the International Organization for Standardization (ISO) 32000-1 or 32000-2 standard, and the application may be an application for opening PDF files for display on a computer interface. In other examples, the application is an application of an office suite software package and the digital document is a document of a file type native to that office suite software package. Example office suites are the Microsoft Office line of software offered by Microsoft Corporation, and the OpenOffice™ line of software offered by the Apache Software Foundation (of which OPENOFFICE is a trademark). Example file formats that may be assessed for maliciousness in accordance with aspects described herein therefore include but are not limited to *.pdf, *.ps, *.doc, *.docx, *.xls, *.xlsx, *.ppt, *.pptx, *.pub, *.vdx, *.mpp, *.one, *.odt, *.ods, *.odg, *.odp, *.odf, *.odc, as examples. Other digital files for assessment may be graphics files, for instance of the type *.jpg, *.bmp, *.png, *.eps, *.svg, and *.ai, as examples.

By way of specific example, an approach for document disposition classification is presented below with an empirical evaluation to determine how well, in that example, it classifies digital documents of the PDF format. An entity resolution strategy is presented that elides instances of programmatic randomness in a whitelist, which greatly reduces the whitelist's size while still allowing for high accuracy in digital document classification. The whitelist is constructed by monitoring the system calls invoked by an application, specifically a document viewer, as it processes, specifically as it renders, a relatively small number of benign documents. The aforementioned classification system is described in detail, then the results of an empirical evaluation thereupon are presented.

Initially described are the features for classification, a feature merging strategy based on a process of entity resolution, and a classifier. The classification approach utilizes features obtained through dynamic analysis on an application as it processes documents. Each recorded feature embeds information about the invocation of a system call by the application. Invoked system calls serve as useful features for discriminating between malicious and benign documents since user-space programs, like a document viewer, makes use of system calls to interact with the underlying operating system, be it for malicious and/or benign actions.

In this example, an introspective hypervisor is used to record the system calls invoked by the document viewer. In other examples, dynamic instrumentation or a custom kernel driver may additionally or alternatively be used to record system call invocations, though these are just examples and other techniques may be used.

Recording the system calls is one aspect of the construction of the set of known benign features based on the benign digital files of the defined file type. The constructing monitors the system calls invoked by the application as it processes benign digital files of some defined file type and featurizes these, e.g. ascertains the semantic actions of the system calls and records the semantic actions as a plurality of benign features.

Table 1 below presents an example set of system calls monitored by dynamic analysis, with their corresponding semantic actions and objects.

TABLE 1

| System Call | Action | Object |
| --- | --- | --- |
| ZwCreateFile | Create | Path to file to be created |
| ZwOpenFile | Open | Path to file to be opened |
| ZwReadFile | Read | Path to file to be read |
| ZwWriteFile | Write | Path to file to be written |
| ZwCreateKey | Create | Path to registry key to be created |
| ZwOpenKey | Open | Path to registry key to be opened |
| ZwQueryKey | Query | Path to registry key to be queried |
| ZwDeleteKey | Delete | Path to registry key to be deleted |
| ZwSetValueKey | Write | Path to registry key value to be set |
| ZwDeleteValueKey | Delete | Path to registry key value to be deleted |
| ZwEnumerateValueKey | Query | Path to registry key to be enumerated |
| ZwCreateProcess | Create | Disk image name of the created process |

A new feature may be recorded each time the application process, or one of its children (child processes), invokes one of the system calls shown in the first column of Table 1. That is, column 1 indicates the system calls that are of interest from a featurization standpoint, in this example. Explanations for these system calls are available from Microsoft Corporation, though more generally any system call characteristics and behavior are a function of the specific operating system involved. It is seen that ascertained semantic action associated with a system call invocation can include creation of a process or a file system operation, such as a file create, a file read, or a file write, as examples.

A feature is recorded in some examples as a k-tuple, for instance as a 3-tuple of the form image, action, object, where image is the file name of the disk image of the process that made the system call, action is the semantic action associated with the observed system call (i.e., create, open, read, write, query, or delete), and object is the name of or the path to the object upon which the specified semantic action is to be performed. Table 1 provides the semantic action and a description of the object associated with each of the identified system calls. It is noted that Table 1 is just one example of a set of system calls that may be monitored; others are possible.

Some examples of recorded features, plus explanations, are shown in Table 2:

TABLE 2

| # | Recorded Feature | Explanation |
| --- | --- | --- |
| 1 | reader.exe,write, C:\temp\2f358b.log | Denotes that reader.exe process attempted to write a file on the specified path. |
| 2 | reader.exe,read, C:\docs\file.pdf | Denotes that reader.exe process attempted to read a file on the specified path. |
| 3 | reader.exe,write, C:\temp\a632cf.log | Denotes that reader.exe process attempted to write a file on the specified path. |

TABLE 2-continued

| # | Recorded Feature | Explanation |
| --- | --- | --- |
| 4 | reader.exe,create,browser.exe | Denotes that reader.exe process spawned a child from the browser.exe disk image. |

The features obtained using the methodology above in monitoring an application as it processes digital files evince a great deal of runtime generated randomness. In particular, the file paths and names encoded in the features' object fields often contain substrings of obviously random characters. For example, the file names embedded in the object fields of example features #1 and #3 in Table 2 above appear to be of the form {6 random hexadecimal characters}.log. Though those two features appear to be semantically equivalent in the sense that they both reflect the writing to a log file by the application, they differ syntactically.

This prevalence of runtime-generated randomness precludes the creation of a comprehensive whitelist of such features that characterizes the class of benign digital files. Rather, an entity resolution procedure is used that elides instances of programmatic randomness in the collected features, and thereby provides a means to recognize that two such features are semantically equivalent even if they are syntactically disparate. Entity resolution as used herein is a generic term to say that two items are "equivalent" to each other.

To this end, aspects described herein employ a heuristic entity resolution technique to merge semantically equivalent yet syntactically disparate features into a single exemplar feature, for instance based on Levenshtein edit distance as seen from examples herein. This entity resolution is applied against the several benign features to merge, into a single benign feature, at least two benign features that differ syntactically but represent a common semantic interaction between the application and the operating system. This merging determines whether a string representation of one benign feature is similar to a string representation of another benign feature, and merges the two based on determining their string representations are similar. Determining similarity includes, in some examples, determining whether the string representation of the one benign feature can be transformed into the string representation of the other benign feature using fewer than some threshold number of edit operations.

Specifically, the set of such exemplar features extracted from a sufficiently representative corpus of benign digital files is interpreted as including a comprehensive exemplar whitelist characterizing the class of benign digital files. Any two features, a and b, can be defined to be α-equivalent if $$\frac{Lev(a, b)}{n} < \alpha,$$

where Lev(a,b) denotes the Levenshtein edit distance between features a and b, and n is the string length of the longer feature. Then, letting C be a set of features obtained from the dynamic analysis on the rendering of a corpus of benign digital files, $W_\alpha$ is deemed the exemplar whitelist for C if and only if $$\forall c \in C, \exists w \in W_\alpha: c \text{ is } \alpha\text{-equivalent to } w.$$

As an example, assume that the features shown in Table 2 arose from the dynamic analysis of a benign PDF document. Also assume $\alpha=0.2$. The edit distance between the first and second example features is 16, the length of the longer of the two is 35, and $16/35<0.2$. Thus, those two features are not $\alpha$-equivalent and are not merged, in this example. Conversely, the edit distance between the first and third example features is 5, they both have the same length of 35, and $5/35<0.2$. Thus, those two features are $\alpha$-equivalent and are merged, in this example. It turns out the first and the third features are the only pair among the example features in Table 2 that are $\alpha$-equivalent. As such, the whitelist corresponding to this initial set of example features contains the second feature, the fourth feature, and either the first or the third feature (the other having been merged).

Naively, one can find a subset of C that meets this definition by starting with an empty whitelist, $W_\alpha$, and iterating over every feature, $c \in C$. At each step, check c for $\alpha$-equivalence with everything in $W_\alpha$ and add c to $W_\alpha$ only if $\exists w \in W_\alpha$ such that c is $\alpha$-equivalent to w. However, this naive strategy tends to be slow since each successive feature is compared to progressively more features as $W_\alpha$ grows, leading to an asymptotic worst case bound of $O(|C|^2 L)$ where L is the worst-case cost of calculating Levenshtein edit distance (i.e., the length of the longest $c \in C$ squared).

Since the naive approach for constructing an exemplar whitelist does not scale, a more efficient strategy is used. Empirically, features that are semantically equivalent tend to be lexicographically close to one another. This observation informs a revised strategy that provides for a significant reduction in the number of required comparisons when constructing $W_\alpha$. The revised strategy is nearly equivalent to the aforementioned strategy except that rather than comparing each successive $c \in C$ to the entirety of the current whitelist, instead c is tested for $\alpha$-equivalence against just the two features in $W_\alpha$ that immediately precede or succeed it lexicographically. This revised strategy has worst case complexity of just $O(|C|L)$.

To show that the revised strategy for exemplar whitelist generation still provides for strong entity resolution as compared to the exhaustive approach, 2,000 exemplar whitelists were constructed, for $\alpha=0.05$ and $\alpha=0.35$, from 2,000 pairs of PDF documents. While doing so, the amount of feature merging that occurred in terms of the number of features that 1) merged with just their lexicographic neighbor(s), 2) merged with just one or more non-neighbors, 3) merged with both a neighbor and a non-neighbor, or 4) did not merge with any other features, were recorded. The results, showing the averaged amount of merging across the 2,000 experiments, are shown in Table 3:

TABLE 3

| % of features merging with | $\alpha = .05$ | $\alpha = .35$ |
| --- | --- | --- |
| No other feature | 0.06 | 0.06 |
| Only neighboring features | 0.05 | 0.04 |
| Only non-neighboring features | 0.14 | 0.12 |
| Neighboring and non-neighboring features | 99.7 | 99.8 |

The results show that on average just 0.06% of features merge with one or more non-neighbors but not with either neighbor. This indicates that testing just lexicographically-neighboring features for $\alpha$-equivalence provides a strong approximation to the exhaustive method.

Benign versus malicious classification is implemented with a heuristic rule-based classifier. A digital file may be classified as malicious when the number, k, of non-mergeable features observed as the application processes the digital file exceeds a threshold, $\beta$. Given a feature merging threshold, $\alpha$, this k for a suspect digital document is determined as follows, as one example:

Let $W_\alpha$ be the exemplar whitelist generated via the method above on a corpus of benign documents for some particular pre-selected $\alpha$, and let S be the set of features collected from rendering the suspect document under the dynamic analysis. For any feature $s \in S$, let $p_s$ and $n_s$ respectively represent the two exemplar features that lexicographically precede and succeed s in $W_\alpha$. Further, let $F: S \to \{0, 1\}$ be defined as $$F(s) = \begin{cases} 1 & \text{if } s \text{ is } \alpha-\text{equivalent to } p_s \text{ or } n_s, \text{ or} \\ 0 & \text{otherwise} \end{cases}$$

Then $$k = |\{s \in S \setminus W_\alpha \mid F(s) \neq 0\}|$$

The document in question is declared malicious if $k > \beta$. Thus, based on the identified number of features that do not correlate to the benign features of the whitelist being above a threshold number, the digital file is determined to be malicious.

In some examples, there may be additional factors to determining maliciousness of the digital file. For instance, the type/action of a feature may be a consideration (with some features being seen as more suspect than other features, and/or there may be multiple thresholds establish, with each such threshold corresponding to a type or class of feature, and maliciousness being determined based on whether some number of such thresholds is exceeded.

In some examples, there may be additional factors to determining maliciousness of the digital file. For instance, the type/action of a feature may be a consideration (with some features being seen as more suspect than other features), and/or there may be multiple thresholds established, with each such threshold corresponding to a type or class of feature, and maliciousness being determined based on whether some number of such thresholds is exceeded.

TABLE 4

| # | Recorded Feature |
| --- | --- |
| A | reader.exe,write,C:\temp\9467f2.log |
| B | reader.exe,write,C:\downloads\payload.exe |
| B | reader.exe,create,payload.exe |

Evaluation of this approach was conducted by classifying the disposition of PDF documents by monitoring their renderings under the Adobe Reader v9.04 document viewer. This particular version of Adobe Reader was selected for use since it is known to be susceptible to several publicly disclosed exploits.

An open-source dataset of both benign and malicious PDF documents was used to conduct the evaluation. From this dataset, 311 of the benign PDFs were used for training, and another 33 benign PDFs plus 33 malicious PDFs were used for testing. The training set size was chosen arbitrarily and the results show that it was more than sufficient. The size of the malicious test set was determined by the number of malicious documents inside of the dataset that are known to target Adobe Reader v9.0. These malicious PDFs include 5 examples of the CVE-2010-2883 exploit, 15 examples of the CVE-2010-0188 exploit, and 13 examples of the CVE-2011-2462 exploit.

As the feature merging threshold α increases, so too does the percentage of features that a merged together. FIG. 1 depicts the effect of varying α in terms of the percentage of original features retained after feature merging via entity resolution, in accordance with aspects described herein. Note that at even relatively low α of, say, 0.05, a reduction of more than half is observed. In other words, over half of the features obtained by monitoring Adobe Reader v9.0 while it renders benign documents only vary due to small amounts of programmatic randomness. Further, as will be seen below, accuracy as high as 90% can even be attained using a up to 0.35, which provides a feature set size reduction of 85% in this example.

Figure 2:
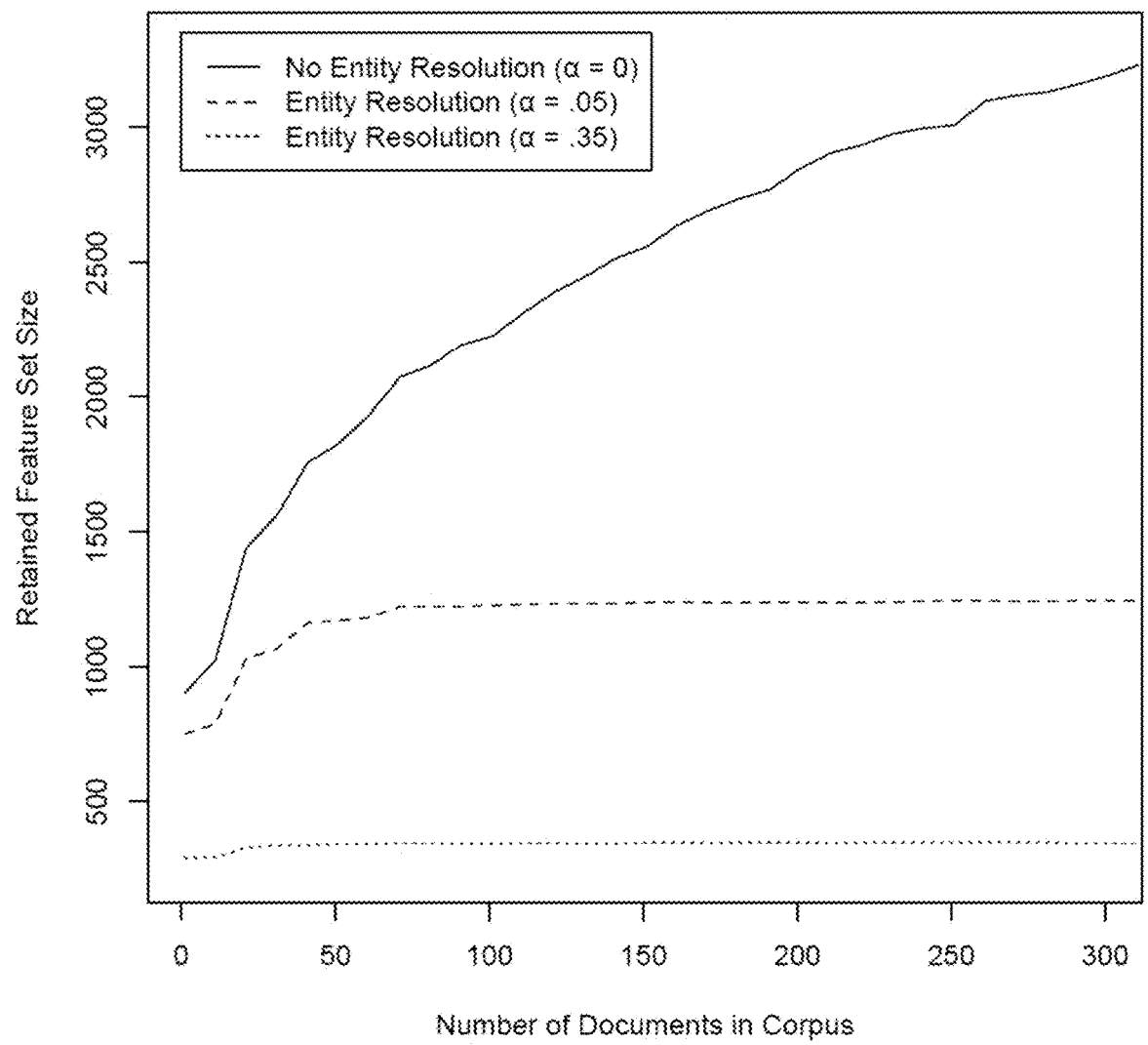
FIG. 2 illustrates a growth rate of a feature whitelist with and without entity resolution-based feature merging as a number of rendered documents is varied, in accordance with aspects described herein.

FIG. 2 illustrates the growth rate of the feature whitelist with and without entity resolution-based feature merging as the number of rendered documents is varied. With no feature merging (i.e., α=0), the size of the whitelist has linear growth proportional to the number of documents rendered. In contrast, feature merging appears to provide an upper bound on the size of the whitelist irrespective of the number of documents rendered. For instance, with α=0.05, the size of the whitelist tops out at 1,247 exemplar features, and with α=0.35, it tops out at 345 exemplar features.

With respect to the quickness with which the upper bound on the whitelist's size is reached, at α=0.05, rendering just 60 documents is sufficient to obtain 95% of the whitelist that is obtained by analyzing the entire training set of 311 documents, and at α=0.35, just 20 benign documents are necessary to obtain 95% of the whitelist constructed using the entire training corpus. This shows that the vast majority of viewer/OS interactions differ only slightly due to runtime variations, and thus a small corpus of, for instance, no more than 100 benign documents is more than sufficient to build a comprehensive whitelist of exemplar features.

Classification accuracy is defined:

$$\frac{TP + TN}{P + N}$$

where TP and TN are, respectively, the count of true positive and of true negative classifications, and P and N are, respectively, the count of malicious and of benign documents in the testing set.

Figure 3:
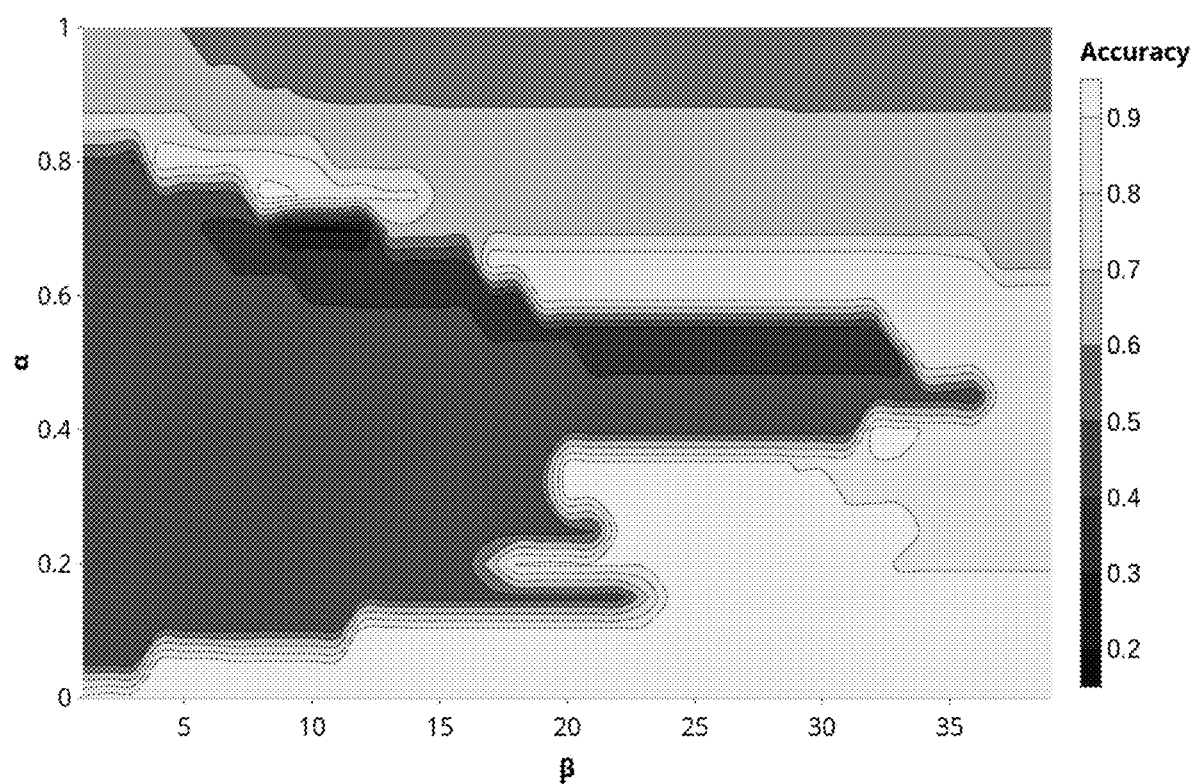
FIG. 3 depicts an example contour map showing classification accuracy attained as a feature merging threshold and anomalous feature threshold are varied, in accordance with aspects described herein.

FIG. 3 depicts a contour map of classification accuracy attained as α and β are varied. The contour map shows that nearly perfect classification accuracy (>98%) is attained with α=0.05 and β=5. High accuracy (>90%) is attained even with more significant feature merging, for instance with α=0.35 and β=25. Consequently, an analyst can perform nearly perfect classifications using a whitelist containing just 1,247 exemplar features and with minimal trade-off can use a significantly smaller whitelist containing just 347 exemplar features. In other words, a model built using only a relatively small (1,247) set of exemplar features is sufficient to classify the disposition of PDF documents with near perfect accuracy, while an even smaller (347) set of exemplar features is enough to attain better than 90% accuracy. Conventional approaches would typically involve millions of exemplar features. Further, the number of benign PDFs that were needed to learn the classification model described was itself very small—as few as 20 benign PDFs were sufficient to build the model that accurately characterizes the class of all benign PDFs.

The results of the evaluation indicate that a classifier using features derived from the system calls that an application (e.g. document viewer) makes as it processes digital files (e.g. renders documents) can attain near perfect accuracy while performing fast and relying on a significantly reduced feature set as compared with other approaches. The benign class of PDF documents in the example above can be characterized by a very small set of viewer/OS interactions that are induced by those documents' collective rendering. Further, these interactions can be learned by monitoring the rendering of just a small number of documents, i.e. a small dataset is sufficient.

Aspects described herein detect malicious digital files by monitoring the application process for malicious activity. This is in contrast to other approaches that have generally sought to statically detect anomalies in documents. Such static detection can be evaded by attackers via the application of obfuscations to their malicious documents. In contrast, methods set forth herein observe malicious interactions that a malicious digital file induces an application to take, irrespective of any applied obfuscations. Aspects differ from other approaches also in that a more manageable-sized whitelist of system call based features is used to characterize the set of benign digital files, rather than a significantly larger dataset that results in slower, less efficient classification with no better accuracy.

Accordingly, a classifier for the disposition of digital files is shown that trains on only a relatively small dataset of benign digital files and retains only a relatively small set of exemplar features. This small-data classifier attains accuracy the same or similar as big-data approaches. In particular, an approach described herein was shown to attain 98% accuracy in classifying PDFs as either malicious or benign. Further, the classification approach described herein entails so few comparisons that it can easily be performed in an online fashion. As such, the proposed strategy is suitable for use in conjunction with any sandboxing or detonation-chamber-based technologies that provide for the tracing of system calls.

Figure 4A:
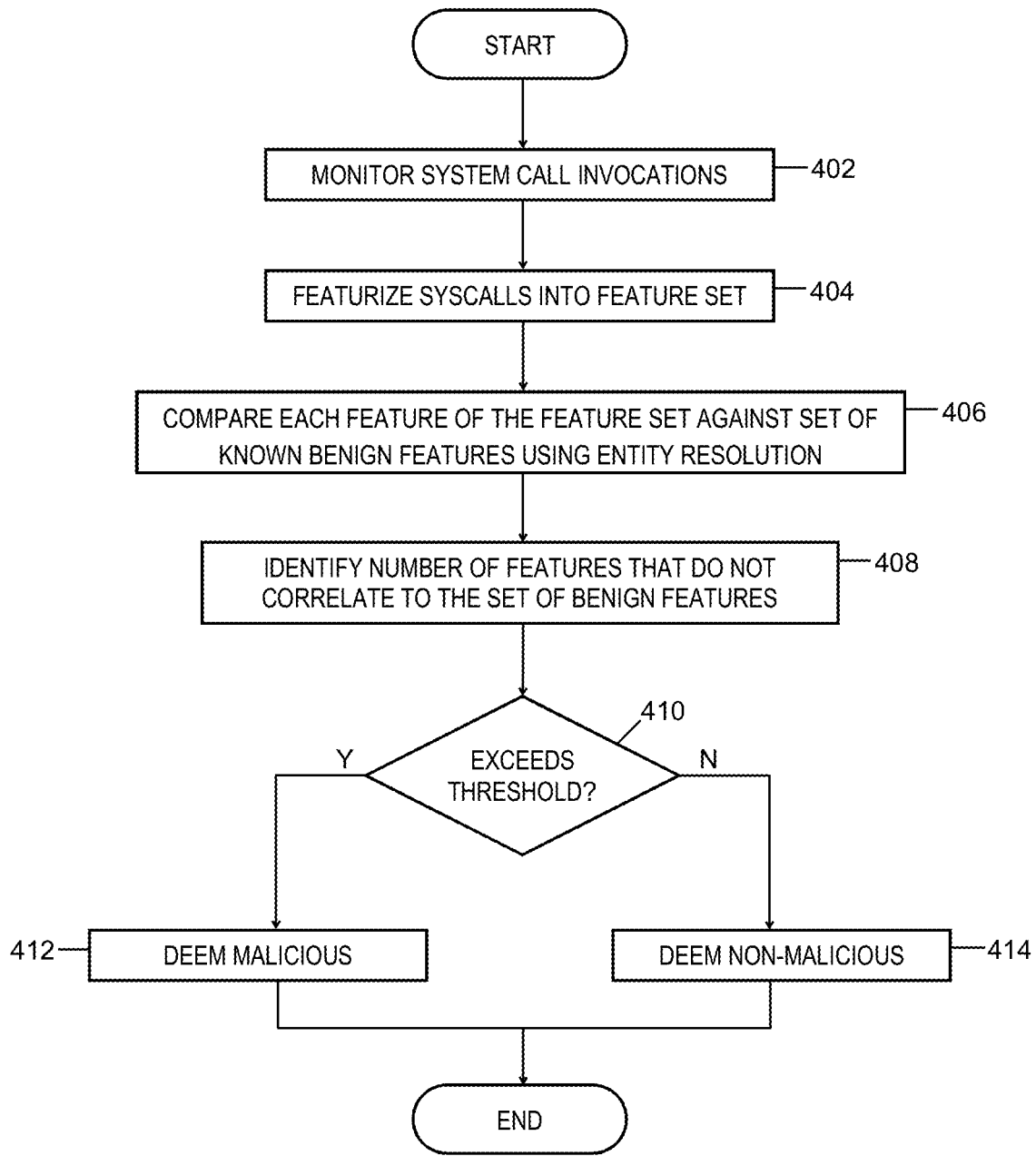
FIGS. 4A-4B depicts aspects of assessing maliciousness of a subject digital file on a computer system, in accordance with aspects described herein.

FIG. 4A depicts an example method for assessing maliciousness of a subject digital file on a computer system, in accordance with aspects described herein. In some examples, the process is performed by one or more computer systems, such as those described herein, which may include one or more computer systems that builds a whitelist of benign features, renders the subject digital file, and/or one of more other computer systems. In some examples, the computer system performing the method of FIG. 4A is different from the computer system on which the digital file is processed, for instance is a host system of a guest in which the digital file is processed, as one example, though in other examples the computer system processing the digital file is the same as the computer system that performs the method of FIG. 4A.

The process includes monitoring system call invocations made to an operating system of the computer system (on which the digital file resides) by an application as the application processes the digital file (402). The digital file is of a defined file type with which the application is associated for processing digital files of the defined file type.

The process automatically featurizes the system call invocations into a set of features corresponding to the digital file (404). Automatically featurizing each system call invocation of the system call invocations can include ascertaining a semantic action associated with the system call invocation, and recording the semantic action as a feature. An ascertained semantic action associated with a system call invocation of the system call invocations can include creation of a process or a file system operation selected from the group consisting of a file create, a file read, or a file write, as examples.

The process of FIG. 4A continues by comparing each feature of the set of features against benign features of a set of known benign features obtained based on benign digital files of the defined file type (406). In some examples, the comparing the features includes, for each feature of the set of features, applying entity resolution between the feature and one or more benign features of the set of known benign features to attempt to find a correlation between the feature and a benign feature of the set of known benign features representing a common semantic interaction between the application and the operating system. The set of known benign features is constructed as described below with reference to FIG. 4B, for instance.

The correlation between the feature and a benign feature of the set of known benign features can include a match between the feature and the benign feature or a merger between the feature and the benign feature based on the feature and the benign feature being deemed to differ syntactically but representing the common semantic interaction between the application and the operating system.

Based on the comparing, the process of FIG. 4A identifies a number of features of the set of features that do not correlate (match or merge) to any of the benign features of the set of known benign features (408). The process then determines maliciousness of the digital file based on the identified number of features that do not correlate to the set of known benign features. It determines whether that number exceeds a threshold (410). If so (410, Y), i.e. based on the identified number of features that do not correlate to the benign features of the set of known benign features being above the threshold number, the file is deemed malicious (412) and the process ends. Otherwise (410, N) the file is deemed non-malicious (414) and the process ends.

The digital file is in some examples a digital document, and the application is or includes a document viewer application. Processing the digital document can therefore include the document viewer rendering the digital document for view. By way of specific example, the digital document is a Portable Document File (PDF) digital document of an International Organization for Standardization (ISO) 32000-1 or 32000-2 standard. Alternatively, the application is an application of an office suite software package and the digital document is or includes a document of a file type native to or renderable by that office suite software package.

Figure 4B:
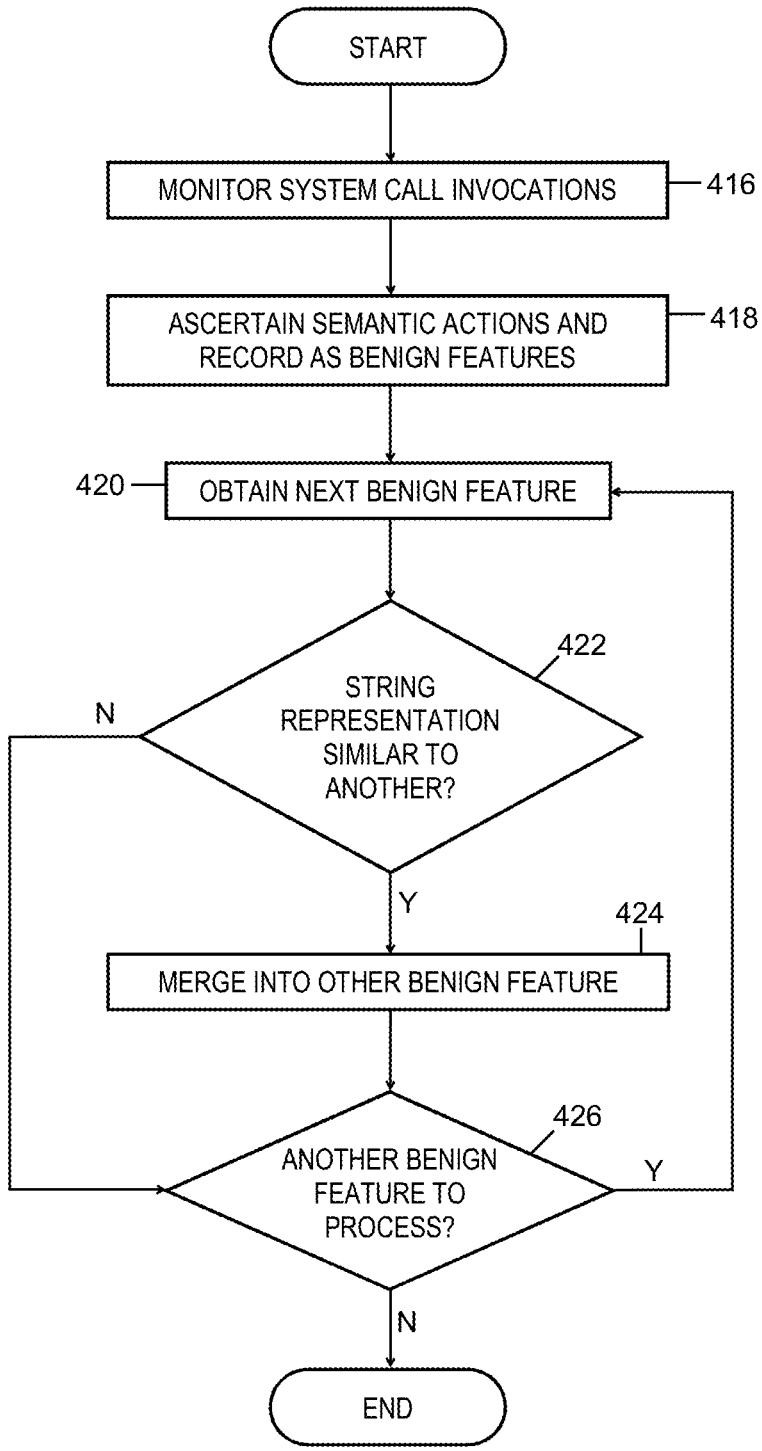

FIG. 4B depicts an example process for constructing a set of known benign features based on benign digital files of a defined file type, in accordance with aspects described herein. This could be performed by any computer system capable of running the same/similar application that will process digital files that are the subject of maliciousness assessments using the set of known benign features. In general, it may be necessary that the computer system run the same operating system since system calls invoked by an application may vary from operating system to operating system. In other words, it may not make sense to compare observations derived from applications running under different operating systems. For instance, the computer system that performs the process of FIG. 4B may be the computer system that performed the assessment of FIG. 4A or a different computer system, for instance one that distributes the constructed set of benign features as a whitelist or other data to one or more computer systems that perform the process of FIG. 4A.

The constructing includes monitoring system calls invoked by the application as it processes the benign digital files of the defined file type (416). The process ascertains semantic actions of the system calls and records the semantic actions as a plurality of benign features (418). The process then applies entity resolution against the plurality of benign features. It does this by merging, into a single benign feature of the set of known benign features, at least two benign features, of the plurality of benign features, that differ syntactically but represent a common semantic interaction between the application and the operating system. Thus, the process obtains a next benign feature to process (420) and determines whether a string representation of that benign feature is similar to a string representation of another benign feature (422). In some examples, determining whether the string representation of one benign feature is similar to the string representation of another benign feature includes determining whether the string representation of the one benign feature can be transformed into the string representation of the other benign feature using fewer than some threshold number of edit operations.

If it is determined at 422 that the string representation of the benign feature is similar to a string representation of another benign feature (422, Y), it merges the features together (424). Then, or if it was determined that the string representations are not similar, the process continues by determining whether there is another benign feature to process (426). If so (426, Y), the process returns to (420) to repeat the processing for a next benign feature. Otherwise (426, N), the process ends.

Although various examples are provided, variations are possible without departing from a spirit of the claimed aspects.

Figure 5:
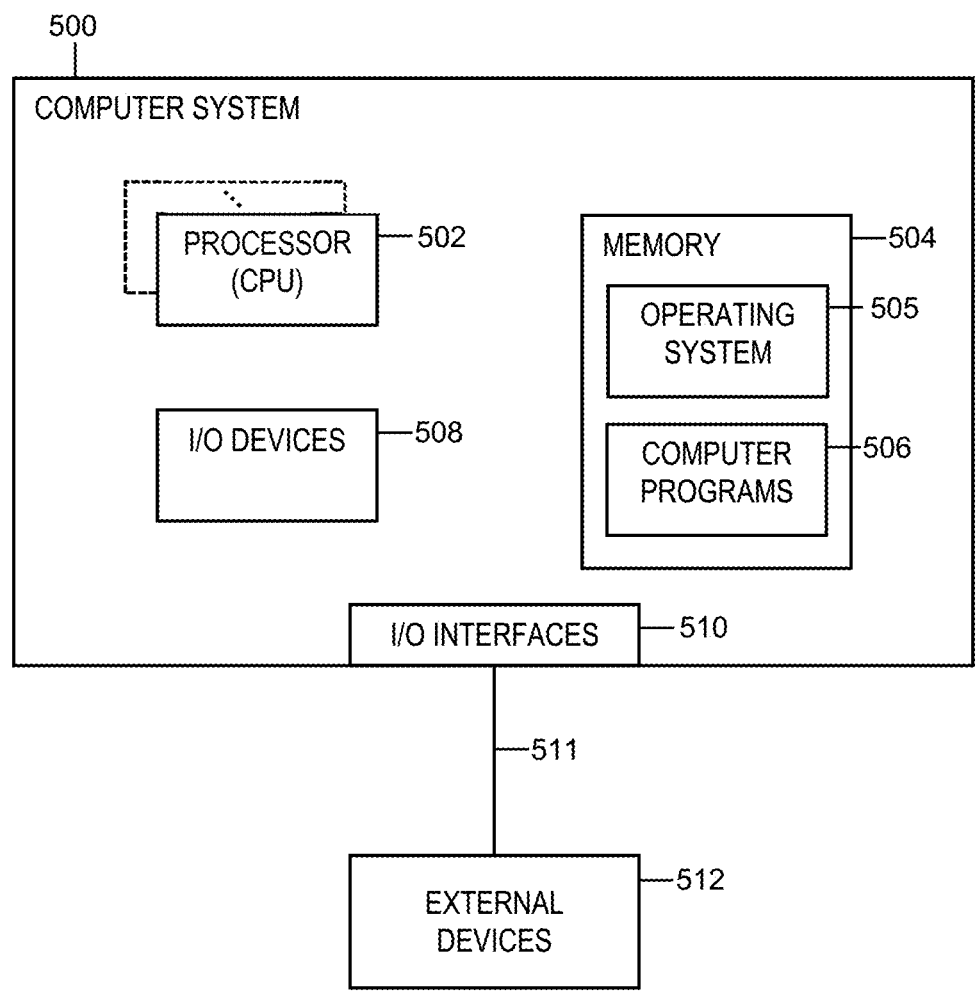
FIG. 5 depicts one example of a computer system and associated devices to incorporate and/or use aspects described herein.

Processes described herein may be performed singly or collectively by one or more computer systems. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for assessing maliciousness of a subject digital file on a computer system, the method comprising:
    monitoring system call invocations made to an operating system of the computer system by an application in which the digital file is opened and as the application processes the digital file, the digital file being of a defined file type with which the application is associated for processing digital files of the defined file type;
    automatically featurizing the system call invocations into a set of features corresponding to the digital file;
    comparing each feature of the set of features against benign features of a set of known benign features obtained based on benign digital files of the defined file type, the comparing comprising, for a feature of the set of features, applying entity resolution between the feature and one or more benign features, of the set of known benign features, that differ from the feature, to attempt to find a correlation between the feature and a benign feature of the set of known benign features representing a common semantic interaction between the application and the operating system;
    identifying, based on the comparing, a number of features of the set of features that do not correlate to the benign features of the set of known benign features; and
    determining maliciousness of the digital file based on the identified number of features that do not correlate to the set of known benign features.

2. The method of claim 1, wherein the correlation between the feature and a benign feature of the set of known benign features comprises a merger between the feature and the benign feature based on the feature and the benign feature differing syntactically but representing the common semantic interaction between the application and the operating system.

3. The method of claim 1, further comprising constructing the set of known benign features based on the benign digital files of the defined file type, the constructing comprising:
    monitoring system calls invoked by the application as it processes the benign digital files of the defined file type;
    ascertaining semantic actions of the system calls and recording the semantic actions as a plurality of benign features; and
    applying entity resolution against the plurality of benign features, the entity resolution comprising merging, into a single benign feature of the set of known benign features, at least two benign features, of the plurality of benign features, that differ syntactically but represent a common semantic interaction between the application and the operating system.

4. The method of claim 3, wherein the merging comprises:
    determining whether a string representation of a first benign feature of the at least two benign features is similar to a string representation of a second benign feature of the at least two benign features; and
    merging the first and second benign features based on determining the string representation of the first benign feature is similar to the string representation of the second benign feature.

5. The method of claim 4, wherein determining whether the string representation of the first benign feature is similar to the string representation of the second benign feature comprises determining whether the string representation of the first benign feature can be transformed into the string representation of the second benign feature using fewer than some threshold number of edit operations.

6. The method of claim 1, wherein automatically featurizing each system call invocation of the system call invocations comprises ascertaining a semantic action associated with the system call invocation, and recording the semantic action as a feature.

7. The method of claim 6, wherein an ascertained semantic action associated with a system call invocation of the system call invocations comprises creation of a process or a file system operation selected from the group consisting of a file create, a file read, or a file write.

8. The method of claim 1, wherein based on the identified number of features that do not correlate to the benign features of the set of known benign features being above a threshold number, the determining maliciousness of the digital file determines that the digital file is malicious.

9. The method of claim 1, wherein the digital file is a digital document, wherein the application comprises a document viewer application and the processing the digital document comprises the application rendering the digital document for view.

10. The method of claim 9, wherein the digital document is a portable document file (PDF) digital document of an International Organization for Standardization (ISO) 32000-1 or 32000-2 standard.

11. The method of claim 9, wherein the application is an application of an office suite software package and wherein the digital document comprises a document of a file type native to that office suite software package.

12. A computer program product for assessing maliciousness of a subject digital file on a computer system, the computer program product comprising:
- a non-transitory computer readable storage medium storing instructions for execution to perform a method comprising:
- monitoring system call invocations made to an operating system of the computer system by an application in which the digital file is opened and as the application processes the digital file, the digital file being of a defined file type with which the application is associated for processing digital files of the defined file type;
- automatically featurizing the system call invocations into a set of features corresponding to the digital file;
- comparing each feature of the set of features against benign features of a set of known benign features obtained based on benign digital files of the defined file type, the comparing comprising, for each a feature of the set of features, applying entity resolution between the feature and one or more benign features, of the set of known benign features, that differ from the feature, to attempt to find a correlation between the feature and a benign feature of the set of known benign features representing a common semantic interaction between the application and the operating system;
- identifying, based on the comparing, a number of features of the set of features that do not correlate to the benign features of the set of known benign features; and
- determining maliciousness of the digital file based on the identified number of features that do not correlate to the set of known benign features.

13. The computer program product of claim 12, wherein the correlation between the feature and a benign feature of the set of known benign features comprises a merger between the feature and the benign feature based on the feature and the benign feature differing syntactically but representing the common semantic interaction between the application and the operating system.

14. The computer program product of claim 12, wherein the method further comprises constructing the set of known benign features based on the benign digital files of the defined file type, the constructing comprising:
- monitoring system calls invoked by the application as it processes the benign digital files of the defined file type;
- ascertaining semantic actions of the system calls and recording the semantic actions as a plurality of benign features; and
- applying entity resolution against the plurality of benign features, the entity resolution comprising merging, into a single benign feature of the set of known benign features, at least two benign features, of the plurality of benign features, that differ syntactically but represent a common semantic interaction between the application and the operating system.

15. The computer program product of claim 14, wherein the merging comprises:
- determining whether a string representation of a first benign feature of the at least two benign features is similar to a string representation of a second benign feature of the at least two benign features, wherein determining whether the string representation of the first benign feature is similar to the string representation of the second benign feature comprises determining whether the string representation of the first benign feature can be transformed into the string representation of the second benign feature using fewer than some threshold number of edit operations; and
- merging the first and second benign features based on determining the string representation of the first benign feature is similar to the string representation of the second benign feature.

16. The computer program product of claim 12, wherein automatically featurizing each system call invocation of the system call invocations comprises ascertaining a semantic action associated with the system call invocation, and recording the semantic action as a feature.

17. A computer system for assessing maliciousness of a subject digital file, the computer system configured to perform a method, the method comprising:
- monitoring system call invocations made to an operating system of the computer system by an application in which the digital file is opened and as the application processes the digital file, the digital file being of a defined file type with which the application is associated for processing digital files of the defined file type;
- automatically featurizing the system call invocations into a set of features corresponding to the digital file;
- comparing each feature of the set of features against benign features of a set of known benign features obtained based on benign digital files of the defined file type, the comparing comprising, for a feature of the set of features, applying entity resolution between the feature and one or more benign features, of the set of known benign features, that differ from the feature, to attempt to find a correlation between the feature and a benign feature of the set of known benign features representing a common semantic interaction between the application and the operating system;
- identifying, based on the comparing, a number of features of the set of features that do not correlate to the benign features of the set of known benign features; and
- determining maliciousness of the digital file based on the identified number of features that do not correlate to the set of known benign features.

18. The computer system of claim 17, wherein the correlation between the feature and a benign feature of the set of known benign features comprises a merger between the feature and the benign feature based on the feature and the benign feature differing syntactically but representing the common semantic interaction between the application and the operating system.

19. The computer system of claim 17, wherein the method further comprises constructing the set of known benign features based on the benign digital files of the defined file type, the constructing comprising:
- monitoring system calls invoked by the application as it processes the benign digital files of the defined file type;
- ascertaining semantic actions of the system calls and recording the semantic actions as a plurality of benign features; and
- applying entity resolution against the plurality of benign features, the entity resolution comprising merging, into a single benign feature of the set of known benign features, at least two benign features, of the plurality of benign features, that differ syntactically but represent a common semantic interaction between the application and the operating system.

20. The computer system of claim 19, wherein the merging comprises:
- determining whether a string representation of a first benign feature of the at least two benign features is similar to a string representation of a second benign feature of the at least two benign features, wherein determining whether the string representation of the first benign feature is similar to the string representation of the second benign feature comprises determining whether the string representation of the first benign feature can be transformed into the string representation of the second benign feature using fewer than some threshold number of edit operations; and merging the first and second benign features based on determining the string representation of the first benign feature is similar to the string representation of the second benign feature.

\* \* \* \* \*